United States Patent
Eggert

(10) Patent No.: US 10,063,598 B2
(45) Date of Patent: Aug. 28, 2018

(54) METHOD AND APPARATUS FOR ESTABLISHING, AUTHENTICATING, AND ACCESSING A CONTENT CHANNEL

(71) Applicant: NOKIA Corporation, Espoo (FI)

(72) Inventor: Jens Eggert, Helsingborg (SE)

(73) Assignee: Nokia Technologies Oy, Espoo (FI)

( * ) Notice: Subject to any disclaimer, the term of this patent is extended or adjusted under 35 U.S.C. 154(b) by 676 days.

(21) Appl. No.: 13/729,821

(22) Filed: Dec. 28, 2012

(65) Prior Publication Data
US 2014/0189115 A1 Jul. 3, 2014

(51) Int. Cl.
- *H04L 29/06* (2006.01)
- *H04W 12/06* (2009.01)
- *H04W 12/08* (2009.01)

(52) U.S. Cl.
CPC ......... *H04L 65/1066* (2013.01); *H04W 12/06* (2013.01); *H04W 12/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,538,389 B1* | 9/2013 | Evans | ................... | G06Q 30/02 345/156 |
| 2004/0268381 A1* | 12/2004 | Simelius | ................. | A63F 13/12 725/19 |
| 2008/0298689 A1* | 12/2008 | Ashbrook et al. | ............ | 382/224 |
| 2009/0116641 A1* | 5/2009 | Bokor et al. | .................... | 380/44 |
| 2009/0154767 A1* | 6/2009 | Kondoh et al. | ............... | 382/101 |
| 2011/0295502 A1 | 12/2011 | Faenger | | |
| 2012/0199647 A1 | 8/2012 | Hwang et al. | | |
| 2014/0117078 A1* | 5/2014 | Duquenoy-bernaudin et al. | ............................ | 235/375 |

FOREIGN PATENT DOCUMENTS

WO 2012/135563 A1 10/2012

* cited by examiner

*Primary Examiner* — Chris Parry
*Assistant Examiner* — Caroline Jahnige
(74) *Attorney, Agent, or Firm* — Ditthavong & Steiner, P.C.

(57) ABSTRACT

An approach is provided for establishing, authenticating, and accessing a content channel. A channel platform receives an input/request for specifying at least one object to associate with at least one content channel. Further, the channel platform and/or a user/device causes, at least in part, a designation of the at least one object, one or more representations of the at least one object, or a combination thereof as at least one key for accessing the at least one content channel, wherein an authentication of the at least one key as presented by at least one device causes, at least in part, a granting of an access to the at least one content channel to the at least one device.

20 Claims, 10 Drawing Sheets

METHOD AND APPARATUS FOR ESTABLISHING, AUTHENTICATING, AND ACCESSING A CONTENT CHANNEL

BACKGROUND

Service providers (e.g., wireless, cellular, etc.) and device manufacturers are continually challenged to deliver value and convenience to consumers by, for example, providing compelling network services. One area of interest is providing the capability for users to establish and access various channels (e.g., via the Internet) for sharing content items with other users. For example, people at a party may wish to share content related to the party and/or to themselves with other people at the party. In various situations, one user may share a content item (e.g., a picture) with one or more other users via one or more local proximity-based communication mechanisms; however, such sharing may be time consuming and difficult where the user may have to establish multiple communication channels/sessions with the other users. Although, the users may share content of interest via a central point (e.g., a website, a share channel, a content channel, etc.), providing and controlling access information for the central point may be inefficient for a host at an event, where it also may be burdensome for other users to login to the central point with traditional authentication credentials.

SOME EXAMPLE EMBODIMENTS

Therefore, there is a need for a simple process for establishing, authenticating, and accessing a content channel.

According to one embodiment, a method comprises determining an input for specifying at least one object to associate with at least one content channel. The method also comprises causing, at least in part, a designation of the at least one object, one or more representations of the at least one object, or a combination thereof as at least one key for accessing the at least one content channel, wherein an authentication of the at least one key as presented by at least one device causes, at least in part, a granting of an access to the at least one content channel to the at least one device.

According to another embodiment, an apparatus comprises at least one processor, and at least one memory including computer program code, the at least one memory and the computer program code configured to, with the at least one processor, cause, at least in part, the apparatus to determine an input for specifying at least one object to associate with at least one content channel. The apparatus is also caused to cause, at least in part, a designation of the at least one object, one or more representations of the at least one object, or a combination thereof as at least one key for accessing the at least one content channel, wherein an authentication of the at least one key as presented by at least one device causes, at least in part, a granting of an access to the at least one content channel to the at least one device.

According to another embodiment, a computer-readable storage medium carries one or more sequences of one or more instructions which, when executed by one or more processors, cause, at least in part, an apparatus to determine an input for specifying at least one object to associate with at least one content channel. The apparatus is also caused to cause, at least in part, a designation of the at least one object, one or more representations of the at least one object, or a combination thereof as at least one key for accessing the at least one content channel, wherein an authentication of the at least one key as presented by at least one device causes, at least in part, a granting of an access to the at least one content channel to the at least one device.

According to another embodiment, an apparatus comprises means for determining an input for specifying at least one object to associate with at least one content channel. The apparatus also comprises means for causing, at least in part, a designation of the at least one object, one or more representations of the at least one object, or a combination thereof as at least one key for accessing the at least one content channel, wherein an authentication of the at least one key as presented by at least one device causes, at least in part, a granting of an access to the at least one content channel to the at least one device.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed method claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for a simple process for establishing, authenticating, and accessing a content channel are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
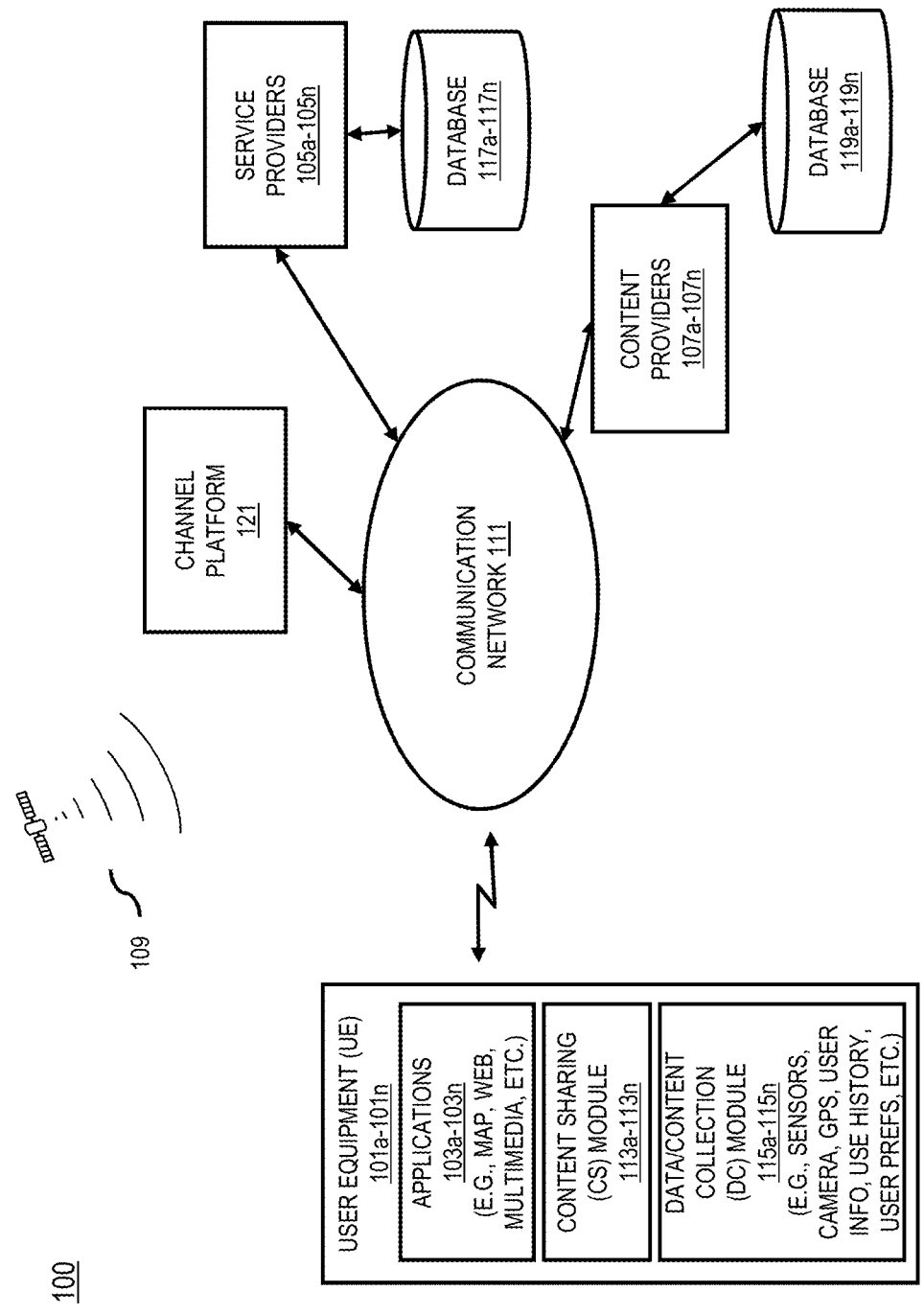
FIG. 1 is a diagram of a system capable of establishing, authenticating, and accessing a content channel, according to one embodiment.

FIG. 1 is a diagram of a system capable of providing a simple process for establishing, authenticating, and accessing a content channel, according to an embodiment. Traditionally, users may share content items via various mechanisms, for example, via device-to-device communication links, via a network content channel (e.g., a server, a service provider, a website, etc.), and the like. In scenarios where users may wish to utilize a content channel, one user may cause/request to establish the content channel and then provide access information of the content channel to other users so that they may login and access/share various content and/or services via the content channel. For example, a user may need to know an address of the content channel (e.g., Internet address, website, etc.), login identification (ID), a password, and the like in order to gain access to the content channel and the content therein. However, sharing and utilizing traditional login information and processes can be time consuming and distracting to users as they may wish to access the content channel quickly without having to perform complex and inefficient steps for login/access. For example, users may wish to share and/or access content via a content channel while at a live event (e.g., a party, a concert, etc.) where entering login information at a device may not be feasible and/or may be distracting to the users. Therefore, service providers face significant challenges in providing a simple process for establishing, authenticating, and accessing a content channel for users wishing to access and/or share content via the content channel.

To address, at least these problems, a system 100 of FIG. 1 introduces the capability of a simple process for establishing, authenticating, and accessing a content channel. More specifically, users in different settings may wish to utilize a simple process for quickly establishing, authenticating, and accessing a content channel whereby a plurality of users may share and/or access various content and/or services therein. In one scenario, a first user at an event (e.g., a party) may initiate setup of a content channel (e.g., at a local/remote server, at a service provider, etc.) so that users at the event may utilize the content channel for sharing content and/or services. Further, to make the authentication steps easy, fun, and interesting for the other users, the first user may select a representation (e.g., an image, a recording sample, a scan, etc.) of an object (e.g., a painting, a water fountain, a couch, etc.) as an access key for the content channel. In one instance, the first user may notify the other users (e.g., via a text message, a poster note at the event, an announcement, etc.) that a representation, e.g., a picture, a scan, etc., of the selected object may be utilized as a key for authentication and access to the content channel. In various examples, the users may utilize various devices (e.g., a camera, a mobile phone, an audio recorder, a scanner, etc.) and applications (e.g., photobeamer, a scanner, a recorder, etc.) to capture, process, and/or submit a media item as a key for authentication and access to the content channel. In one scenario, the users may utilize one or more available proximity-based communication mechanisms in conjunction with the content channel for sharing one or more information items, content items, media items, and the like.

In one embodiment, users may utilize an application on their user devices to establish and/or access a content channel, wherein one or more service providers, content providers, servers, and/or other components of the system 100 may be predefined in the application. For example, in a particular application (e.g., photobeamer), a service provider, a website, network resources, and the like may be predefined in the application, which application may further synchronize the service provider, website, network resources, and the like information with other user devices at an event. In one embodiment, users at an event may be asked to determine/find an object (e.g., as an entraining/fun activity), which may have been used to set an access key to a content channel associated with the current event.

Although the users may utilize local proximity-based communication channels for sharing content items among the present users, however, in various use cases the proximity-based communication channels alone may not be most efficient (e.g., required proximity between devices, file size, slow, etc.) for sharing various content items of various types among the present users.

In one embodiment, the system 100 determines an input for specifying at least one object to associate with at least one content channel. In one embodiment, one or more service providers, servers, content providers, and the like may receive an input, e.g., from a first user at an event, which may indicate an object (e.g., a statue) for association with a content channel for the event where the first user and one or more other users may like to access the content channel for sharing content. Further, the content channel (or an event channel) may have a start-time and an end-time specified by the users, by the service providers, by the event, and the like. In one embodiment, the content channel may be available before and/or after one or more activities begin and/or end at the event. In one embodiment, an application utilized by a user to specify the object and initiate a content channel may indicate a service provider, a server, a content provider, and the like to be used for establishing the content channel.

In one embodiment, the system 100 causes, at least in part, a designation of the at least one object, one or more representations of the at least one object, or a combination thereof as at least one key for accessing the at least one content channel, wherein an authentication of the at least one key as presented by at least one device causes, at least in part, a granting of an access to the at least one content channel to the at least one device. In one embodiment, the one or more representations include, at least in part, one or more images, one or more audio samples, one or more videos, one or more models, or a combination thereof of the at least one object. In one embodiment, a user may utilize a device to capture an image and/or a sample recording (e.g., video, audio, etc.) of the specified object and submit it as a key to a service provider, a server, and the like for establishing, authenticating, and accessing the content channel, whereby the users may share various content items. In one embodiment, the at least one device captures one or more media samples of the at least one object, and wherein the one or more media samples represents the at least one key as presented by the at least one device for authentication. For example, the media item may include a picture of the object that is specified as the key for accessing the content channel. In one embodiment, the service provider 105 may process a content item (e.g., an image, a video, an audio sample, etc.) received from a user wherein the content item is to be a key for establishing, authenticating, and accessing the content channel. In one embodiment, the service provider 105 may utilize various algorithms, software, and/or processes for detecting the content item and comparing to the initial object and/or representation of the object. Further, if the content item submitted by a user substantially matches the established key, then access to the content channel may be granted to the user.

In one embodiment, the at least one object, the one or more representations of the at least one object, or a combination thereof represent, at least in part, one or more markers for the at least one content channel. In one instance, a service provider may determine/mark a content channel based, at least in part, on the object and/or the one or more representations of the at least one object. For example, a certain web address or location at a server may be marked and associated with the at least one object and/or the one or more representations of the at least one object. In one embodiment, the at least one object, the one or more representations of the at least one object, or a combination thereof substitutes, at least in part, for one or more barcodes as the one or more markers. In one embodiment, the objects and/or the one or more representations of the at least one object may be utilized as a key or as a marker in place of one or more barcodes (e.g., graphical codes.) For example, a poster at an event may identify a barcode and an image of an object as a marker and key for accessing a content channel associated with the event, wherein a user may scan/capture a representation of the image as a key to access the content channel.

In one embodiment where the at least one content channel is associated with at least one event, the system 100 determines one or more validity criteria for the at least one key, the at least one content channel, or a combination thereof based, at least in part, on one or more contextual parameters associated with the at least one event. In one embodiment, the one or more contextual parameters include, at least in part, a duration of the at least one event, a location of the at least one event, or a combination thereof. In one embodiment, the content channel may be associated with an event (e.g., event channel) wherein the establishing, authenticating, and accessing the content channel/event channel may be further based, at least in part, on one or more information items associated with the event, for example, location information, time/date information, user information, and the like. For example, the content channel may be available for a specified time period only to users who are physically at a venue associated with the content channel.

In one embodiment, the system 100 causes, at least in part, a subscription to the at least one content channel based, at least in part, on the authentication of the one or more media samples against the one or more representations of the at least one object designated as the at least one key. In one embodiment, a service provider may utilize one or more algorithms and/or software applications (e.g., image detection, audio analysis, etc.) to analyze and compare a submitted sample representation against a specified key associated with a content channel, wherein if the submitted sample substantially matches the specified key, then an access to the content channel may be granted to the user/device submitting the sample. In one embodiment, the authentication enables a downloading, an uploading, a viewing, or a combination thereof of one or more content items by the at least one device over the at least one content channel.

In one embodiment, the system 100 causes, at least in part, a labeling to at least one object to indicate the designation of the at least one object, the one or more representations of the at least one object, or a combination thereof as the at least one key. In one embodiment, a first user may label an object and/or a representation of an object (e.g., a note on a painting at the event) as a key to a content channel so that other users may capture and submit a sample (e.g., image, audio, video, etc.) of the object and or the representation of an object in order to access the content channel established for the venue. In various embodiments, the first user may notify other users of the object and/or the one or more representations via one or more available communication methods (e.g., SMS, announcements, etc.) in addition to or in place of the labeling.

In various embodiments, one or more users may utilize capabilities and benefits of the system 100 to easily establish one or more content/event channels and specify an object and/or a representation of an object for authenticating access to the channels so that other users may access the channels by utilizing images, representations, audio samples, videos, and the like of the object and/or of the representation of an object for authentication and access, thereby making the authentication/access process easy, interesting, fun, and intuitive for the users interested in accessing the channels.

As shown in FIG. 1, in one embodiment, the system 100 includes user equipment (UE) 101a-101n (also collectively referred to as UE 101 and/or UEs 101), which may be utilized to execute one or more applications 103a-103n (also collectively referred to as applications 103) including social networking, web browser, content sharing, multimedia applications, user interface (UI), map application, web client, etc. to communicate with other UEs 101, one or more service providers 105a-105n (also collectively referred to as service providers 105), one or more content providers 107a-107n (also collectively referred to as content providers 107), one or more GPS satellites 109a-109n (also collectively referred to as GPS satellites 109), and/or with other components of the system 100 directly and/or via communication network 111. In one embodiment, the UEs 101 may include content sharing modules 113a-113n (also collectively referred to as the CS module 113.) In one embodiment, the UEs 101 may include data/content collection modules 115a-115n (also collectively referred to as DC module 115) for determining and/or collecting data and/or content associated with the UEs 101, one or more users of the UEs 101, applications 103, one or more content items (e.g., multimedia content), and the like. In addition, the UEs 101 can execute an application 103 that is a software client for storing, processing, and/or forwarding one or more information items to other components of the system 100.

In one embodiment, the CS module 113 and a camera module may be utilized to scan, capture, process, submit, analyze, append, etc. representations of various objects; for example, a picture, a graphical code, and the like, which may be submitted to the service providers 105, the content providers 107, and/or to other entities of the system 100. In one embodiment, a captured representation may be utilized as a secret key for accessing a content channel for sharing various content items and/or services. In various embodiments, the CS module 113 may perform various tasks in conjunction with the applications 103 and/or the DC module 115 to capture, share, and/or submit the one or more representations. In various embodiments, the CS module 113 may also include various components for capturing various representations of various types of content items, for example, video, audio, graphical codes (e.g., barcodes) scanner, and the like. In various embodiments, the graphical codes include various types of one dimensional and two dimensional codes. For example, the barcodes may include encoded linear bars, stacked bars, in color code, quick response (QR) code, matrix format code, in various orientations, and the like, wherein the graphical codes may be standardized. In one embodiment, the CS module 113 may include various predefined parameters and configuration information associated with a user, a user device, one or more service providers, one or more content providers, and the like. In one embodiment, the CS module 113 may determine a best content channel based, at least in part, on user information, user preferences, user location, associated event, types of content to be shared/accessed, and the like. In one embodiment, the CS module 113 may be associated with a dedicated service provider service site (e.g., a website) whereat one or more content channels may be established.

In one embodiment, the service providers 105 may include and/or have access to one or more databases 117a-117n (also collectively referred to as database 117), which may include various user information, user profiles, user preferences, one or more profiles of one or more user devices (e.g., device configuration, sensors information, etc.), service providers 105 information, other service providers' information, and the like. In one embodiment, the service providers 105 may include one or more service providers offering one or more services, for example, online shopping, social networking services (e.g., blogging), content sharing, media upload, media download, media streaming, account management services, or a combination thereof.

Further, the service providers 105 may conduct a search for content items, media items, information, coupons, and the like associated with one or more users, POIs, geo-locations, and the like. In one embodiment, a service provider 105 may receive and process a request/input from a user for establishing a content channel wherein one or more users may share content items among the users. In one embodiment, the service provider 105 may utilize various algorithms, software applications, modules, hardware, firmware, and the like for processing, recognizing, detecting, comparing, and the like content items (e.g., media items) that may be associated with a content channel and use a processed content item for authenticating one or more users wishing to access the content channel if the users submit substantially same content item as a key for accessing the content channel.

In one embodiment, the content providers 107 may include and/or have access to one or more database 119a-119n (also collectively referred to as database 119), which may store, include, and/or have access to various content items. For example, the content providers 107 may store content items (e.g., at the database 119) provided by various users, various service providers, crowd-sourced content, and the like. Further, the service providers 105 and/or the content providers 107 may utilize one or more service application programming interfaces (APIs)/integrated interface, through which communication, media, content, and information (e.g., associated with users, applications, services, content, etc.) may be shared, accessed and/or processed.

The UEs 101 may be any type of mobile terminal, fixed terminal, or portable terminal including a mobile handset, station, unit, device, healthcare diagnostic and testing devices, product testing devices, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, loud speakers, display monitors, radio broadcast receiver, electronic book device, game device, wrist watch, or any combination thereof, including the accessories and peripherals of these devices, or any combination thereof. It is also contemplated that the UEs can support any type of interface to the user (such as "wearable" circuitry, etc.) Further, the UEs 101 may include various sensors for collecting data associated with a user, a user's environment, and/or with a UE 101, for example, the sensors may determine and/or capture audio, video, images, atmospheric conditions, device location, user mood, ambient lighting, user physiological information, device movement speed and direction, and the like.

In one embodiment, the UE 101 includes a location module/sensor that can determine the UE 101 location (e.g., a user's location). The UE 101 location may be determined by a triangulation system such as a GPS, assisted GPS (A-GPS), Cell of Origin, wireless local area network triangulation, or other location extrapolation technologies. Standard GPS and A-GPS systems can use the one or more satellites 109 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module/sensor may also utilize multiple technologies to detect the location of the UE 101. GPS coordinates can provide finer detail as to the location of the UE 101. In another embodiment, the UE 101 may utilize a local area network (e.g., LAN, WLAN) connection to determine the UE 101 location information, for example, from an Internet source (e.g., a service provider).

By way of example, the communication network 111 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UEs 101, the service providers 105, and the content providers 107 may communicate with each other and other components of the communication network 111 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the UEs 101 and the service providers 105 may interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. It is also noted that the role of a client and a server is not fixed; in some situations a device may act both as a client and a server, which may be done simultaneously and/or the device may alternate between these roles.

Figure 2:
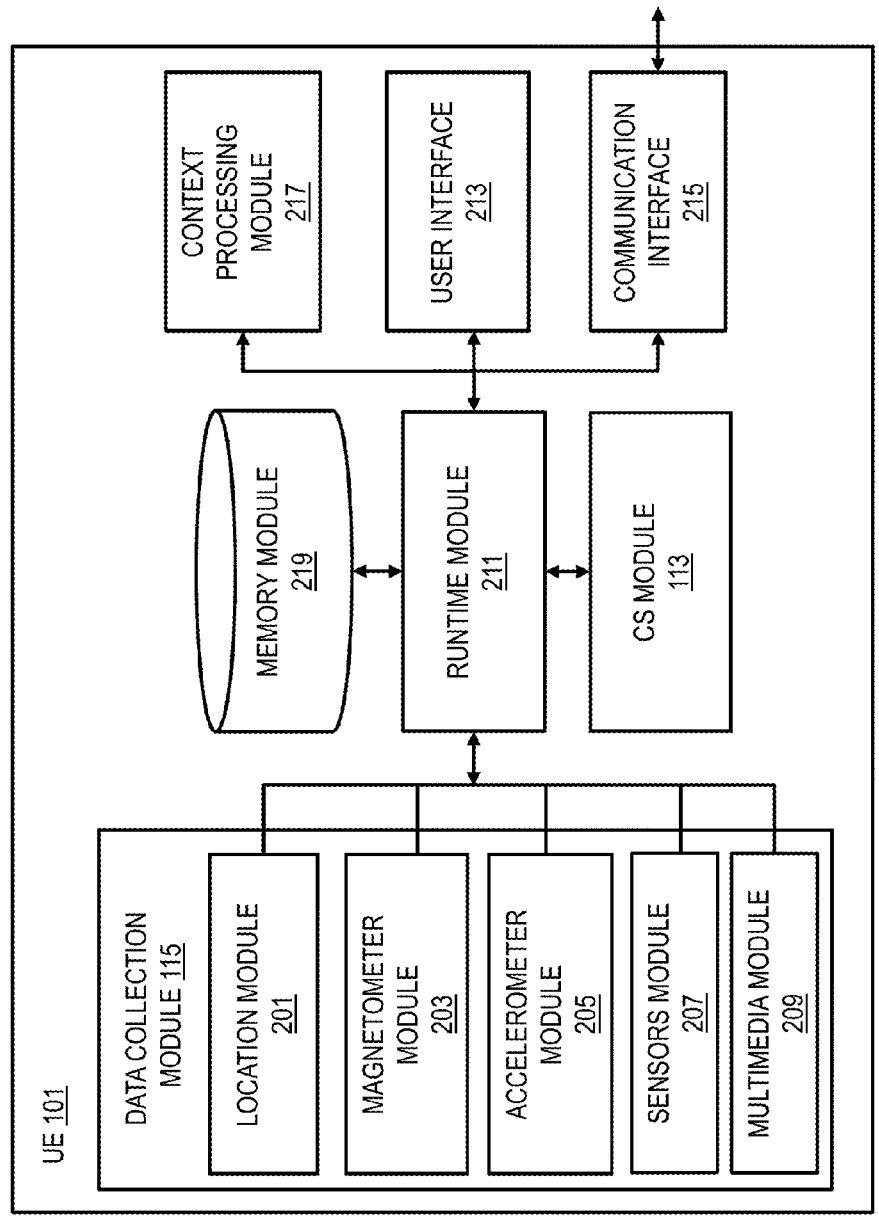
FIG. 2 is a diagram of components of a user equipment capable of content sharing, according to an embodiment.

FIG. 2 is a diagram of the components of a user equipment capable of content sharing, according to an embodiment. By way of example, a UE 101 includes one or more components for capturing and submitting representations of objects for establishing, authenticating, and accessing one or more content channels. It is contemplated that the functions of these components may be combined in one or more components or performed by other components of equivalent functionality. In this embodiment, the UE 101 includes a DC module 115 that may include one or more location modules 201, magnetometer modules 203, accelerometer modules 205, sensors module 207, and multimedia module 209. Further, the UE 101 may also include a runtime module 211 to coordinate the use of other components of the UE 101, the CS module 113, a user interface 213, a communication interface 215, a context processing module 217, and a memory module 219. The applications 103 of the UE 101 can execute on the runtime module 211 utilizing the components of the UE 101.

The location module 201 can determine a user's location, for example, via location of a UE 101. The user's location can be determined by a triangulation system such as GPS, assisted GPS (A-GPS), Cell of Origin, or other location extrapolation technologies. Standard GPS and A-GPS systems can use satellites 109 to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 201 may also utilize multiple technologies to detect the location of the UE 101. Location coordinates (e.g., GPS coordinates) can give finer detail as to the location of the UE 101 when media is captured. In one embodiment, GPS coordinates are stored as context information in the memory module 219 and are available to the context processing module 217, the DC module 115, the service providers 105, and/or to other entities of the system 100 (e.g., via the communication interface 215.) Moreover, in certain embodiments, the GPS coordinates can include an altitude to provide a height. In other embodiments, the altitude can be determined using another type of altimeter. In certain embodiments, the location module 201 can be a means for determining a location of the UE 101, an image, or used to associate an object in view with a location.

The magnetometer module 203 can be used in finding horizontal orientation of the UE 101. A magnetometer is an instrument that can measure the strength and/or direction of a magnetic field. Using the same approach as a compass, the magnetometer is capable of determining the direction of a UE 101 using the magnetic field of the Earth. The front of a media capture device (e.g., a camera) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer can be stored in memory module 219, made available to other modules and/or applications 103 of the UE 101, and/or transmitted via the communication interface 215 to one or more entities of the system 100.

The accelerometer module 205 can be used to determine vertical orientation of the UE 101. An accelerometer is an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 205 can determine the angle the UE 101 is pointed as compared to Earth's gravity. In certain embodiments, the magnetometer module 203 and accelerometer module 205 can be means for ascertaining a perspective of a user. This perspective information may be stored in the memory module 219, made available to other modules and/or applications 103 of the UE 101, and/or sent to one or more entities of the system 100.

In various embodiments, the sensors module 207 can process sensor data from various sensors (e.g., GPS, accelerometer, gyroscope, thermometer, etc.) to determine environmental (e.g., atmospheric) conditions surrounding the UE 101, user mood (e.g., hungry, angry, tired, etc.), location information, and various other information from a range sensors that may be available on one or more devices. For example, the sensors module 207 may detect conditions including humidity, temperature, geo-location, biometric data of the user, etc. Once again, this information can be stored in the memory module 219 and sent to the context processing module 217 and/or to other entities of the system 100. In certain embodiments, information collected from the DC collection module 115 can be retrieved by the runtime module 211 and stored in memory module 219, made available to other modules and/or applications 103 of the UE 101, and/or sent to one or more entities of the system 100.

In one embodiment, the multimedia module 209 may be utilized to capture various media items, for example, images, video, audio, and the like, wherein the captured media may be submitted to one or more modules and applications of the UE 101, a service provider, and/or a content provider to further processing, storage, sharing, and the like. For example, a captured image of a POI (e.g., a building), an object (e.g., a car, a painting, a dog, etc.) may be submitted to a service provider and/or the context processing module 217 for analysis and correlation to one or more authentication keys (e.g., metadata), for example, to access a content and/or event channel.

In one embodiment, the communication interface 215 can be used to communicate with one or more entities of the system 100. Certain communications can be via methods such as an internet protocol, messaging (e.g., SMS, MMS, etc.), or any other communication method (e.g., via the communication network 111). In some examples, the UE 101 can send context information associated with the UE 101 to the service providers 105, content providers 107, and/or to other entities of the system 100.

The user interface 213 can include various methods of communication. For example, the user interface 213 can have outputs including a visual component (e.g., a screen), an audio component, a physical component (e.g., vibrations), and other methods of communication. User inputs can include a touch-screen interface, a scroll-and-click interface, a button interface, a microphone, etc. Input can be via one or more methods such as voice input, textual input, typed input, typed touch-screen input, other touch-enabled input, etc.

The context processing module 217 may be utilized in determining context information from the CS module 113, DC module 115 and/or applications 103 executing on the runtime module 211. This information may be caused to be transmitted, via the communication interface 215, to the service providers 105 and/or to other entities of the system 100. The context processing module 217 may additionally be utilized as a means for determining information related to the user, an instance of data, a value, a content item, an object, a subject, and the like. In certain embodiments, the context processing module 217 can infer higher level context information from the context data such as favorite locations, significant places, common activities, interests in products and services, POIs at various geo-locations, etc.

In various embodiments, the runtime module may cause one or more modules/components of a UE 101 to associate one or more available data items with one or more content items available from the one or more modules/components of the UE 101. For example, date, time, location, and user information associated with a device at a particular time may be associated (e.g., as metadata) with an image that is captured by the UE 101 at that particular time.

Figure 3:
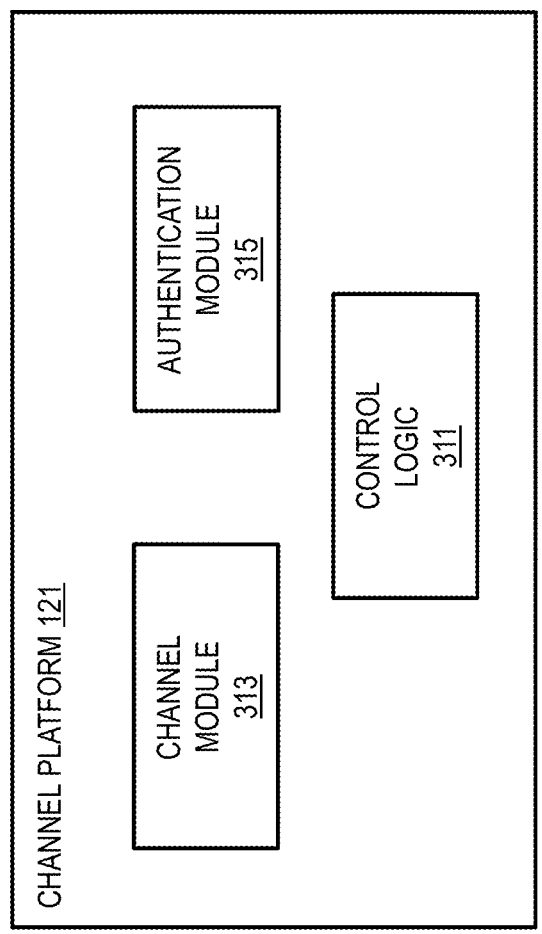
FIG. 3 is a diagram of components of a channel platform, according to an embodiment.

FIG. 3 is a diagram of the components of the channel platform, according to an embodiment. By way of example, the channel platform 121 includes one or more components for establishing and providing access to one or more content channels. It is contemplated that the functions of these components may be combined in one or more components or performed by other components of equivalent functionality. In this embodiment, the channel platform 300 includes a control logic 311, channel module 313, and authentication module 315. In one embodiment, the control logic 311 and channel module 313 may manage one or more content channels at one or more service providers, content providers, servers, and the like. As previously discussed, a content channel may be requested by a user whereby a plurality of users may utilize the content channel for sharing various content items, and wherein the user may provide a key for authenticating other users to access the content channel. In one embodiment, the key may include a media item, for example, an image, a video, an audio recording associated with an object (e.g., a painting, a dog, a car, a table, etc.) In one embodiment, a user may utilize an application and/or a module wherein configuration information of the content channel, user information, user preferences, and the like may be predefined. Alternately, the channel platform 300 may determine all or partial configuration information based on available resources at the system 100.

In one embodiment, the control logic 311 and channel module 313 may receive a request/input from a user for establishing a content channel (e.g., a website) for sharing content among users, wherein the channel module may determine one or more parameters associated with the user preferences, user history, venue associated with the user, content type for sharing, number of anticipated users, user service provider, and the like. Further, the channel module 313 may utilize a predefined dedicated content channel or may determine a suitable channel based, at least in part, on the determined parameters and information.

In one embodiment, the control logic 311 and authentication module 315 may cause an authentication of users/ devices for access to the content channel. For example, the control logic 311 and the authentication module 315 may process a media/content item submitted by a user which is to be a key for accessing a content channel. In one embodiment, the authentication module 315 may utilize one or more algorithms, software applications, modules, and the like for determining/detecting an object in a media item and compare the determined/detected object in the media item with the key associated with the content channel. For example, the key may be a picture of a painting located at a particular geo-location (e.g., at a certain clubhouse) and if the media item submitted by a user includes a picture of the painting that was captured at that particular geo-location, then the user may be authenticated and granted access to the content channel.

Figure 4:
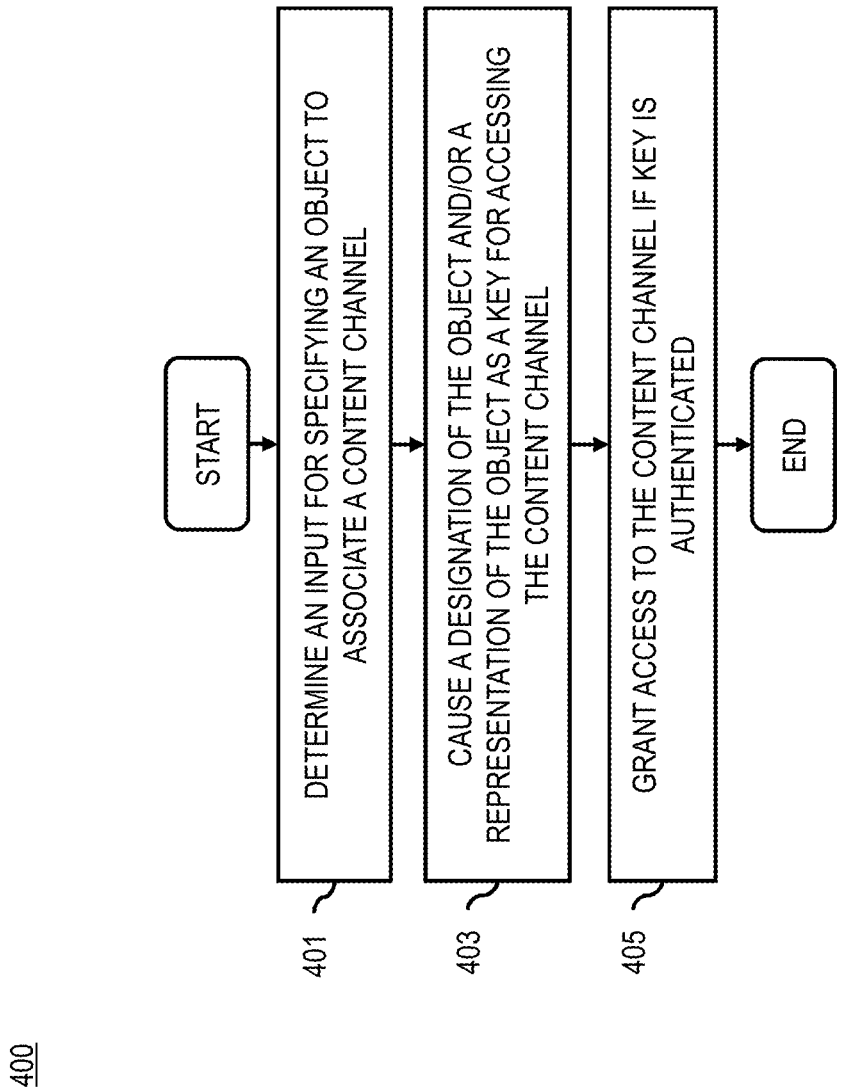
FIGS. 4 and 5 illustrate flowcharts of various processes for, at least, establishing, authenticating, and accessing a content channel, according to various embodiments.
Figure 5:
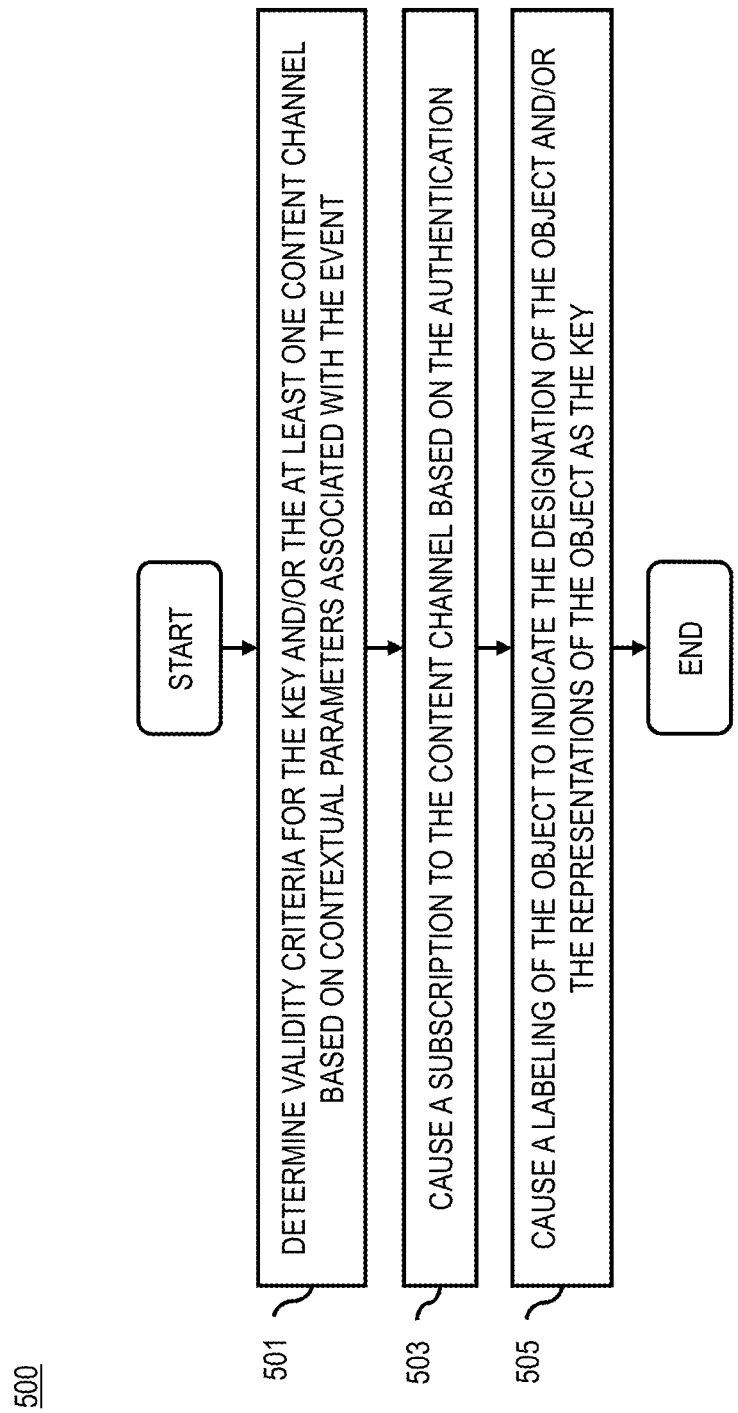
Figure 9:
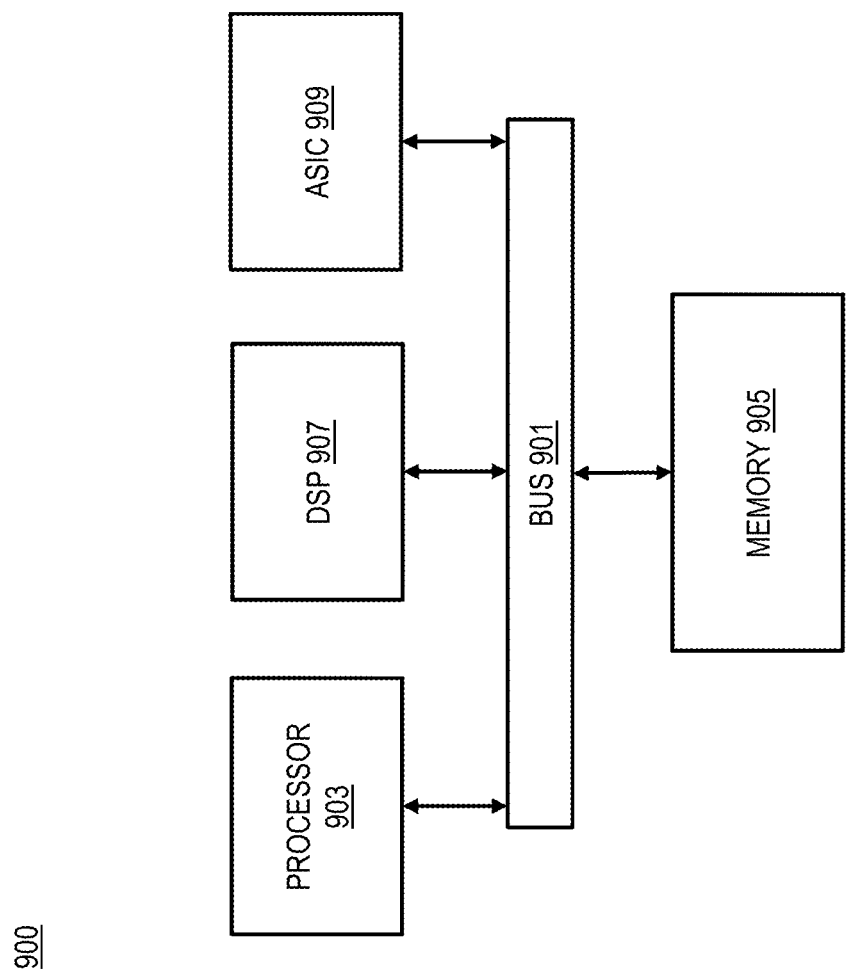
FIG. 9 is a diagram of a chip set that can be used to implement an embodiment of the invention.

FIGS. 4 and 5 illustrate flowcharts of various processes for, at least, establishing, authenticating, and accessing a content channel, according to various embodiments. In various embodiments, a the channel platform 121 and/or the CS module 113 may perform processes 400 and 500 that may be implemented in, for instance, a chip set including a processor and a memory as shown in FIG. 9. As such, the channel platform 121 and the CS module 113 can provide means for accomplishing various parts of the process 400 and 500 as well as means for accomplishing other processes in conjunction with other components of the system 100. Throughout this process, the channel platform 121 and the CS module 113 may be referred to as completing various portions of the processes 400 and 500, however, it is understood that other components of the system 100 can perform some of and/or all of the process steps. Further, in various embodiments, the channel platform 121 and the CS module 113 may be implemented in one or more entities of the system 100.

Referring to FIG. 4, the process 400 begins at step 401 where the channel platform 121 and/or the CS module 113 determine an input for specifying at least one object to associate with at least one content channel. In one embodiment, one or more service providers, servers, content providers, and the like may receive an input, e.g., from a first user at an event, which may indicate an object (e.g., a statue) for association with a content channel for the event where the first user and one or more other users may like to access the content channel for sharing content. Further, the content channel (or an event channel) may have a start-time and an end-time specified by the users, by the service providers, by the event, and the like. In one embodiment, the content channel may be available before and/or after one or more activities begin and/or end at the event. In one embodiment, an application utilized by a user to specify the object and initiate a content channel may indicate a service provider, a server, a content provider, and the like to be used for establishing the content channel.

In step 403, the channel platform 121 and/or the CS module 113 cause, at least in part, a designation of the at least one object, one or more representations of the at least one object, or a combination thereof as at least one key for accessing the at least one content channel, wherein an authentication of the at least one key as presented by at least one device causes, at least in part, a granting of an access to the at least one content channel to the at least one device. In one embodiment, the one or more representations include, at least in part, one or more images, one or more audio samples, one or more videos, one or more models, or a combination thereof of the at least one object. In one embodiment, a user may utilize a device to capture an image and/or a sample recording (e.g., video, audio, etc.) of the specified object and submit it as a key to a service provider, a server, and the like for establishing, authenticating, and accessing the content channel, whereby the users may share various content items. In one embodiment, the at least one device captures one or more media samples of the at least one object, and wherein the one or more media samples represents the at least one key as presented by the at least one device for authentication. For example, the media item may include a picture of the object that is specified as the key for accessing the content channel.

In step 405, the channel platform 121 may process a content item (e.g., an image, a video, an audio sample, etc.) received from a user wherein the content item is to be a key for establishing, authenticating, and accessing the content channel. In one embodiment, the service provider 105 may utilize various algorithms, software, and/or processes for detecting the content item and comparing to the initial object and/or representation of the object. Further, if the content item submitted by a user substantially matches the established key, then access to the content channel may be granted to the user.

In one embodiment, the at least one object, the one or more representations of the at least one object, or a combination thereof represent, at least in part, one or more markers for the at least one content channel. In one instance, a service provider may determine/mark a content channel based, at least in part, on the object and/or the one or more representations of the at least one object. For example, a certain web address or location at a server may be marked and associated with the at least one object and/or the one or more representations of the at least one object. In one embodiment, the at least one object, the one or more representations of the at least one object, or a combination thereof substitutes, at least in part, for one or more barcodes as the one or more markers. In one embodiment, the objects and/or the one or more representations of the at least one object may be utilized as a key or as a marker in place of one or more barcodes (e.g., graphical codes.) For example, a poster at an event may identify a barcode and an image of an object as a marker and key for accessing a content channel associated with the event, wherein a user may scan/capture a representation of the image as a key to access the content channel.

Referring to FIG. 5, the process 500 begins at step 501 where the at least one content channel is associated with at least one event, the channel platform 121 determines one or more validity criteria for the at least one key, the at least one content channel, or a combination thereof based, at least in part, on one or more contextual parameters associated with the at least one event. In one embodiment, the one or more contextual parameters include, at least in part, a duration of the at least one event, a location of the at least one event, or a combination thereof. In one embodiment, the content channel may be associated with an event (e.g., event channel) wherein the establishing, authenticating, and accessing the content channel/event channel may be further based, at least in part, on one or more information items associated with the event, for example, location information, time/date information, user information, and the like. For example, the content channel may be available for a specified time period only to users who are physically at a venue associated with the content channel.

In step 503, the channel platform 121 causes, at least in part, a subscription to the at least one content channel based, at least in part, on the authentication of the one or more media samples against the one or more representations of the at least one object designated as the at least one key. In one embodiment, the channel platform 121 may utilize one or more algorithms and/or software applications (e.g., image detection, audio analysis, etc.) to analyze and compare a submitted sample representation against a specified key associated with a content channel, wherein if the submitted sample substantially matches the specified key, then an access to the content channel may be granted to the user/device submitting the sample. In one embodiment, the authentication enables a downloading, an uploading, a viewing, or a combination thereof of one or more content items by the at least one device over the at least one content channel.

In step 505, the channel platform 121 causes, at least in part, a labeling to at least one object to indicate the designation of the at least one object, the one or more representations of the at least one object, or a combination thereof as the at least one key. In one embodiment, a first user may label an object and/or a representation of an object (e.g., a note on a painting at the event) as a key to a content channel so that other users may capture and submit a sample (e.g., image, audio, video, etc.) of the object and or the representation of an object in order to access the content channel established for the venue. In various embodiments, the first user may notify other users of the object and/or the one or more representations via one or more available communication methods (e.g., SMS, announcements, etc.) in addition to or in place of the labeling.

Figure 6:
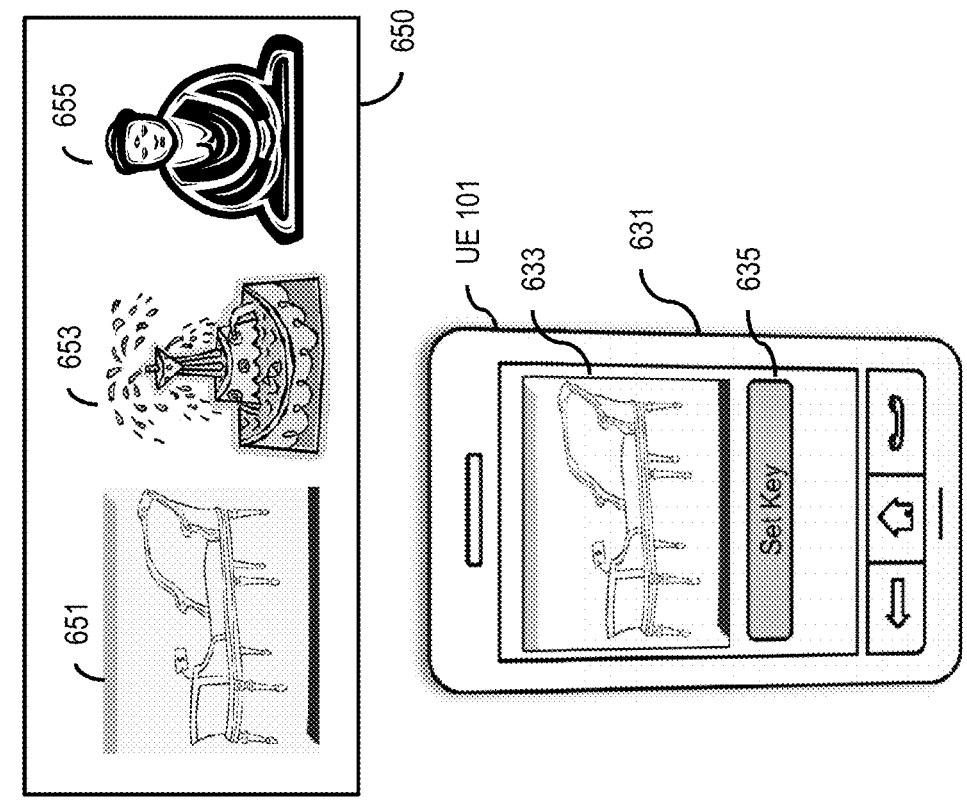
FIG. 6 illustrates example diagrams utilized in the processes of the FIGS. 4 and 5, according to various embodiments.
Figure 6:
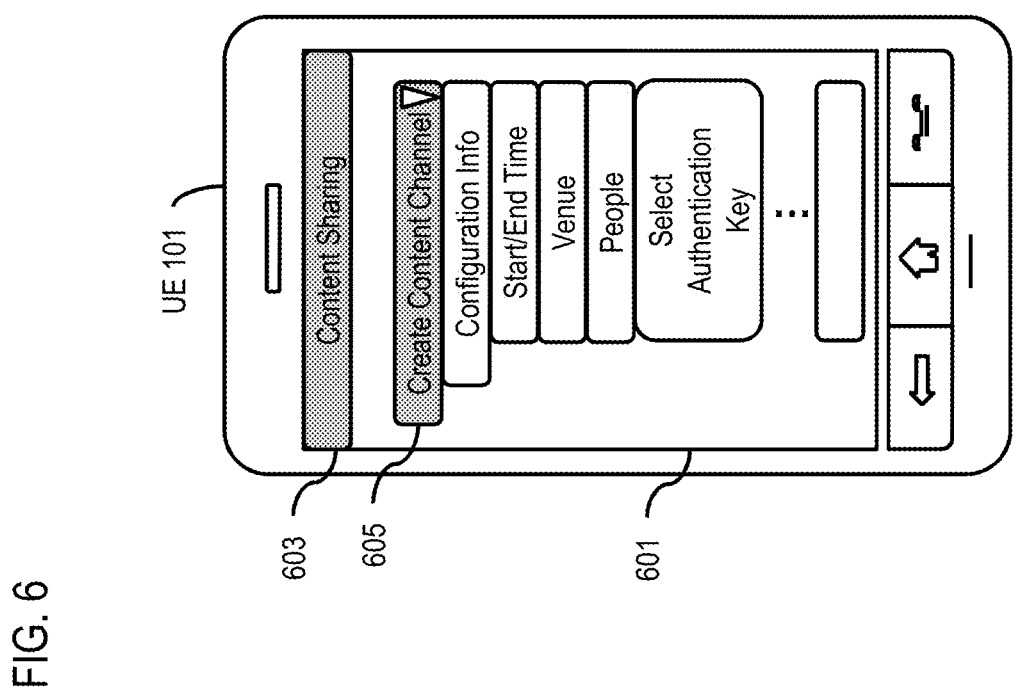

FIG. 6 illustrates example diagrams utilized in the processes of the FIGS. 4 and 5, according to various embodiments. As shown, the example diagrams include UIs 601 and 631 on a UE 101 and object examples in list 650. In one embodiment, a user may utilize a content sharing application 603 (e.g., CS module 113) in UI 601 to request for a content channel. In one embodiment, the content sharing application 603 may determine all or portions of the channel configuration information 605, for example, from user preferences, user information, user location, network resources, and the like. In one embodiment, the user may provide additional configuration information 605, for example, start/end times, venue, a number of people anticipated to join the channel, and the like. In one embodiment, the channel configuration information may be defined by a service provider. Further, the UI 631 shows a capture/image 633 of an object 651 from a list of objects 650, wherein the objects may be located at or near the venue where the users of a content channel may be. In one instance, a content channel is for a party taking place at a clubhouse, where the objects or representations of the objects of the list 650 may be (e.g., an antique chair 651, a water fountain 653, and a statue 655). In one example in UI 631, a user captures the image 633 of the antique chair 651 in the list 650 and submits it to a service provider (e.g., channel platform 121) to set as the key for accessing the requested content channel for the party at the clubhouse.

Figure 7:
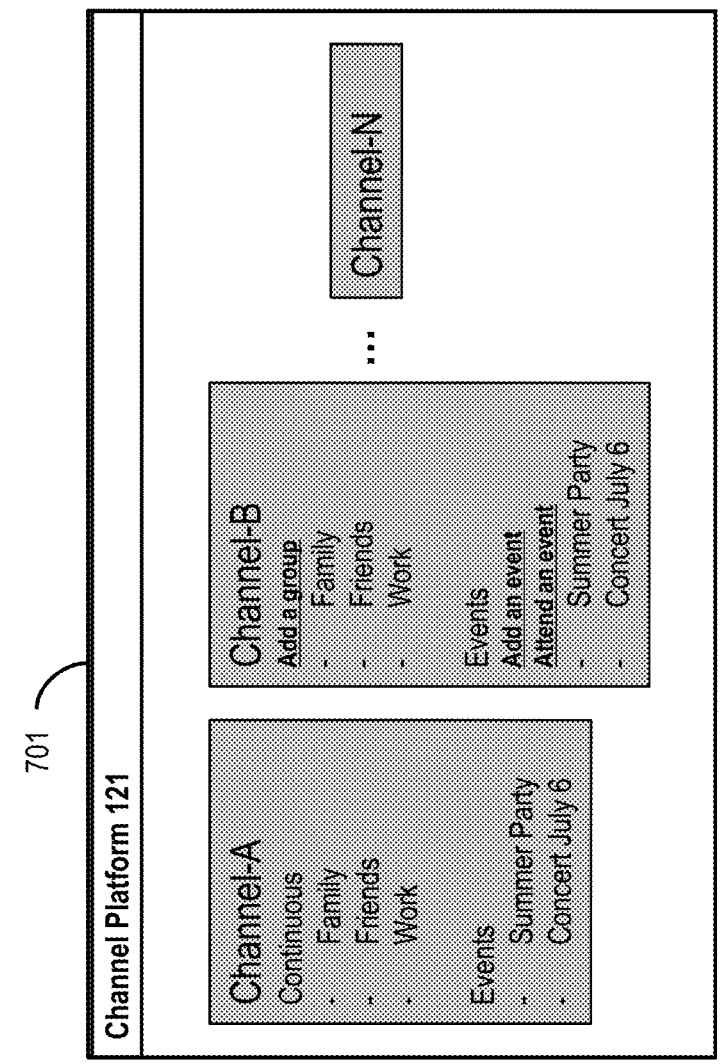
FIG. 7 illustrates channel information at a channel platform, according to various embodiments.

FIG. 7 illustrates channel information at a channel platform, according to various embodiments. As shown, the example channel listing 701 may be at the channel platform 121 and/or a service provider 105, which may include information on various channels A-N that may be associated with various users, various events, various locations, and the like. In one embodiment, a content channel, for example Channel-A, may be accessible (e.g., shareable, viewable, etc.) by multiple users and/or user groups, for instance, Family, Friends, Work, etc., where shared content items may be access by the identified users and groups. Further, the content channel may be available continuously (e.g., as a service) or may be available for a particular event (e.g., Summer Part, Concert July 6th, etc.) and/or a particular time/date. In one embodiment, a user, the channel platform 121, and/or a service provider 105 may add a user, a group of users, an event, and the like, in Channel-B, wherein the added parameters may provide additional access and/or cause additional content channel requests. Further, a user may choose to attend/join an event in Channel-B. In one use case scenario, a user may attend a summer party where users may share contents, e.g., photos, videos, audio recordings, and the like, with other users at the party, where the access key may be set as "take a scan of the blue painting by the entrance in the clubhouse." In embodiment, a user may utilize a UE 101 including a QR code reader, scanner, a camera, a Photobeamer application, and the like for scanning/capturing an image of a designated key object.

The processes described herein for establishing, authenticating, and accessing a content channel may be advantageously implemented via software, hardware, firmware, or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
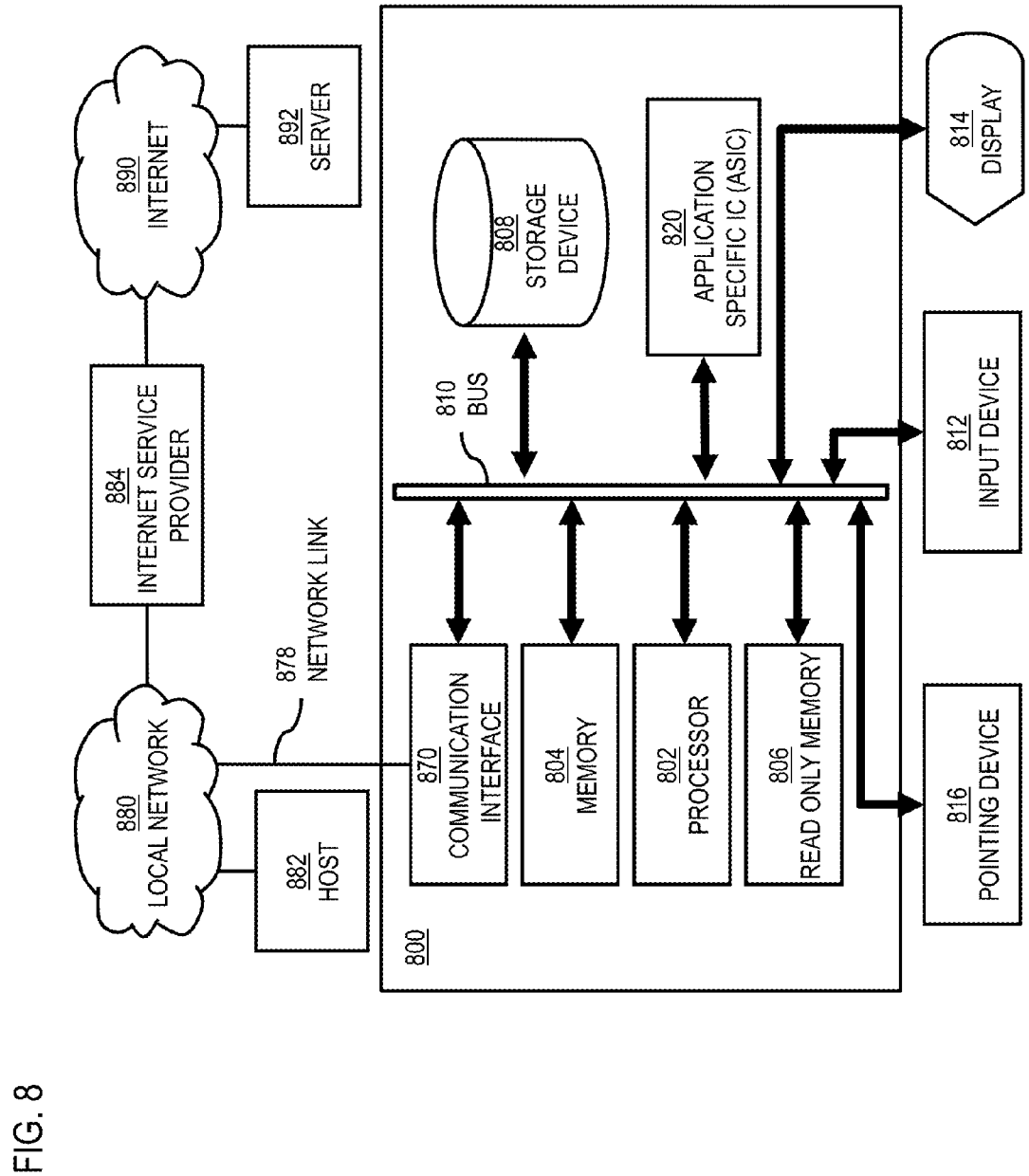
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) for establishing, authenticating, and accessing a content channel as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of authentication and accessing a content channel.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to establishing, authenticating, and accessing a content channel. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for establishing, authenticating, and accessing a content channel. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for establishing, authenticating, and accessing a content channel, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814, and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners, and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic, or electromagnetic signals, including infrared and optical signals that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 111 for establishing, authenticating, and accessing a content channel.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880, and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed for establishing, authenticating, and accessing a content channel as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of authentication and accessing to a content channel.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein for establishing, authenticating, and accessing a content channel. The memory 905 also stores the data associated with or generated by the execution of the inventive steps.

Figure 10:
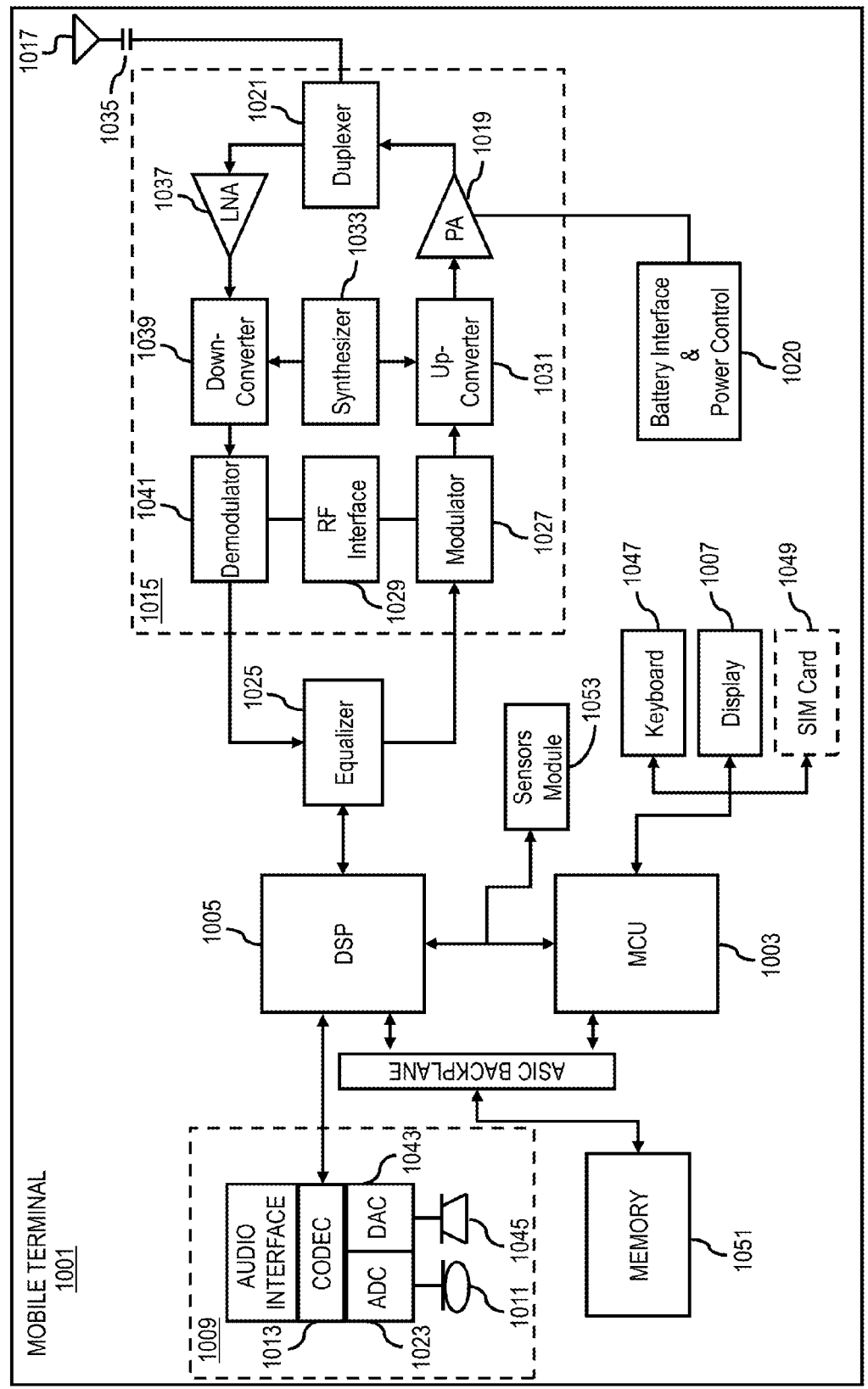
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of establishing, authenticating, and accessing a content channel. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of establishing, authenticating, and accessing a content channel. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a UI software to facilitate user control of at least some functions of the mobile terminal 1001 for establishing, authenticating, and accessing a content channel. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

Additionally, sensors module 1053 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 1001 (e.g., a mobile phone), a user of the mobile terminal 1001, an environment of the mobile terminal 1001 and/or the user, or a combination thereof, wherein the data may be collected, processed, stored, and/or shared with one or more components and/or modules of the mobile terminal 1001 and/or with one or more entities external to the mobile terminal 1001.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
    at least one determination, using a first user device located at least one event, of an input for specifying at least one object to associate with at least one content channel; and
    a designation, using the first user device located at the at least one event, of the at least one object, one or more representations of the at least one object, or a combination thereof as at least one authentication key for accessing the at least one content channel from a location of the at least one event,
    wherein an authentication of the at least one authentication key as presented by at least one second user device at the at least one event authenticates the at least one second user device to access to the at least one content channel.

2. A method of claim 1, wherein the at least one object, the one or more representations of the at least one object, or a combination thereof represent, at least in part, one or more markers for the at least one content channel.

3. A method of claim 2, wherein the at least one object, the one or more representations of the at least one object, or a combination thereof substitutes, at least in part, for one or more barcodes as the one or more markers.

4. A method of claim 1, wherein the one or more representations include, at least in part, one or more images, one or more audio samples, one or more videos, one or more models, or a combination thereof of the at least one object.

5. A method of claim 1, wherein the (1) data and/or (2) information and/or (3) at least one signal are further based, at least in part, on the following:
    at least one determination of one or more validity criteria for the at least one key, the at least one content channel, or a combination thereof based, at least in part, on one or more contextual parameters associated with the at least one event.

6. A method of claim 5, wherein the one or more contextual parameters include, at least in part, a duration of the at least one event, a location of the at least one event, or a combination thereof.

7. A method of claim 1, wherein the (1) data and/or (2) information and/or (3) at least one signal are further based, at least in part, on the following:
    a subscription to the at least one content channel based, at least in part, on the authentication of the one or more media samples against the one or more representations of the at least one object designated as the at least one key.

8. A method of claim 1, wherein the authentication enables a downloading, an uploading, a viewing, or a combination thereof of one or more content items by the at least one device over the at least one content channel.

9. A method of claim 1, wherein the (1) data and/or (2) information and/or (3) at least one signal are further based, at least in part, on the following:

a labeling to at least one object to indicate the designation of the at least one object, the one or more representations of the at least one object, or a combination thereof as the at least one key.

10. A method of claim 1, wherein the (1) data and/or (2) information and/or (3) at least one signal are further based, at least in part, on the following:
   a transmission of at least one announcement message from the first user device to the at least one second user device for presentation to at least one user of the at least one second user device,
   wherein the announcement message describes that the at least one object as the authentication key without including the authentication key.

11. An apparatus comprising:
   at least one processor; and
   at least one memory including computer program code for one or more programs,
   the at least one memory and the computer program code configured to, with the at least one processor, cause the apparatus to perform at least the following,
      determine, using a first user device located at least one event, an input for specifying at least one object to associate with at least one content channel; and
      cause, at least in part, a designation, using the first user device located at the at least one event, of the at least one object, one or more representations of the at least one object, or a combination thereof as at least one authentication key for accessing the at least one content channel,
      wherein an authentication of the at least one authentication key as presented by at least one second user device at the at least one event authenticates the at least one second user device to access to the at least one content channel.

12. An apparatus of claim 11, wherein the at least one object, the one or more representations of the at least one object, or a combination thereof represent, at least in part, one or more markers for the at least one content channel.

13. An apparatus of claim 12, wherein the at least one object, the one or more representations of the at least one object, or a combination thereof substitutes, at least in part, for one or more barcodes as the one or more markers.

14. An apparatus of claim 11, wherein the one or more representations include, at least in part, one or more images, one or more audio samples, one or more videos, one or more models, or a combination thereof of the at least one object.

15. An apparatus of claim 11, wherein the at least one content channel is associated with at least one event, wherein the apparatus is further caused to:
   determine one or more validity criteria for the at least one key, the at least one content channel, or a combination thereof based, at least in part, on one or more contextual parameters associated with the at least one event.

16. An apparatus of claim 15, wherein the one or more contextual parameters include, at least in part, a duration of the at least one event, a location of the at least one event, or a combination thereof.

17. An apparatus of claim 11, further comprising wherein the apparatus is further caused to:
   cause, at least in part, a subscription to the at least one content channel based, at least in part, on the authentication of the one or more media samples against the one or more representations of the at least one object designated as the at least one key.

18. An apparatus of claim 11, wherein the authentication enables a downloading, an uploading, a viewing, or a combination thereof of one or more content items by the at least one device over the at least one content channel.

19. An apparatus of claim 11, wherein the apparatus is further caused to:
   cause, at least in part, a labeling to at least one object to indicate the designation of the at least one object, the one or more representations of the at least one object, or a combination thereof as the at least one key.

20. An apparatus of claim 11, wherein the apparatus is further caused to:
   cause, at least in part, a transmission of at least one announcement message from the first user device to the at least one second user device for presentation to at least one user of the at least one second user device,
   wherein the announcement message describes that the at least one object as the authentication key without including the authentication key.

* * * * *